U S006377869B1

(12) United States Patent
Watanabe et al.

(10) Patent No.: US 6,377,869 B1
(45) Date of Patent: Apr. 23, 2002

(54) ROBOT CONTROLLER WITH ABNORMALITY MONITORING FUNCTION

(75) Inventors: Atsushi Watanabe, Tokyo; Tetsuya Kosaka; Hiromitsu Takahashi, both of Minamitsuru-gun, all of (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/605,844

(22) Filed: Jun. 29, 2000

(51) Int. Cl.[7] .............................................. G06F 19/00
(52) U.S. Cl. ...................... 700/245; 700/246; 700/247; 700/248; 700/249; 700/253; 700/255; 700/256; 700/257; 318/568.12; 318/568.13; 318/568.14; 318/568.15; 318/568.16; 318/568.24; 318/567; 901/2; 901/9; 901/31; 701/2; 701/23
(58) Field of Search .............................. 700/245–249, 700/182, 260, 251, 253, 255–257, 559, 262, 254; 318/568.12–568.16, 568.24; 219/125.11–125.12, 121.34, 121.46; 118/500, 503, 679; 901/680–681, 31, 43, 30, 41, 42, 2, 4; 701/2

(56) References Cited

U.S. PATENT DOCUMENTS

| 4,725,943 | A | | 2/1988 | Kuriyama et al. ............. 364/184 |
|---|---|---|---|---|
| 4,877,940 | A | * | 10/1989 | Bangs et al. ............. 219/124.34 |
| 5,521,353 | A | * | 5/1996 | Mitsui et al. ................ 219/127 |
| 5,798,627 | A | * | 8/1998 | Gilliland et al. ........ 318/568.14 |
| 5,968,297 | A | * | 10/1999 | Hooker et al. ................ 156/64 |
| 6,021,361 | A | * | 2/2000 | Taninaga et al. ............. 700/182 |
| 6,076,109 | A | * | 5/2000 | McDee et al. ............... 709/228 |
| 6,097,169 | A | * | 8/2000 | Watanabe et al. ........ 318/568.21 |
| 6,134,102 | A | * | 10/2000 | Worn et al. .................. 361/680 |
| 6,208,105 | B1 | * | 3/2001 | Kato et al. ............. 318/568.24 |
| 6,197,115 | B1 | * | 5/2001 | Barrey et al. ................ 118/681 |
| 6,243,621 | B1 | * | 6/2001 | Tao et al. ............... 318/568.24 |
| 6,267,918 | B1 | * | 7/2001 | Bauer .......................... 700/245 |
| 6,271,500 | B1 | * | 8/2001 | Hirayama et al. ...... 219/130.01 |

FOREIGN PATENT DOCUMENTS

| EP | 62038780 | 2/1987 |
|---|---|---|
| EP | 08103870 | 4/1996 |
| JP | 3-254369 | * 11/1991 |

* cited by examiner

Primary Examiner—William A. Cuchlinski, Jr.
Assistant Examiner—McDieunel Marc
(74) Attorney, Agent, or Firm—Staas & Halsey LLP

(57) ABSTRACT

A robot controller having a function of monitoring abnormality of a robot operation to prevent an accident by stopping supply of energy or operational substance to an operational tool when the operational tool is abnormally stopped. Motion command pulses for a robot motion are obtained by computing operations when a motion statement of the operation program is read out and stored in a shared memory. Motors for driving respective robot axes are driven based on the motion command pulses. When an I/O output command is issued on a signal line to actuate an arc welder, the operation control software demands to set a predetermined waiting time period to a timer. The managing software demands to start a countdown of the timer and informs the operation control software of an elapse of the set waiting time period. The operation control software determines that an abnormality has occurred if all of the present motion command pulses stored in the shared memory are zero, and turns off the signal line to forcedly terminates the actuation of the operational tool. In the midst of the operation, if the operational tool remains unmoved over a predetermined time period, it is also determined that an abnormality has occurred and the operation is forcedly terminated.

14 Claims, 6 Drawing Sheets

FIG.4

PROGRAM PNS 0001

1: RESPECTIVE AXES, POSITION [1], 100% POSITIONING   (MOTION TO RIGIN)

2: RESPECTIVE AXES, POSITION[2], SMOOTH 100

3: STRAIGHT LINE, POSITION[3], 500cm/min, POSITIONING (WELDING START POSITION)

4: SDO [1] = ON   (COMMAND FOR ARC START TO WELDER)

5: WAITING SDI [1] = ON   (WAITING FOR CONFIRMATION OF ARC GENERATION FROM WELDER)

6: STRAIGHT LINE, POSITION [4], 200 cm/min, SMOOTH 100

7: STRAIGHT LINE, POSITION [5], 200 cm/min, SMOOTH 100

8: STRAIGHT LINE, POSITION [6], 200cm/min, POSITIONING (WELDING COMPLETION POSITION)

9: SDI [1] = OFF   (COMMAND FOR ARC STOP TO WELDER)

10: STRAIGHT LINE, POSITION [7], 500 cm/min, SMOOTH 100

11: RESPECTIVE AXES, POSITION [1], 100% POSITIONING   (MOTION TO ORIGIN)

[END]

ROBOT CONTROLLER WITH ABNORMALITY MONITORING FUNCTION

BACKGROUND OF THE INVENTION

1. Field of the Invention

The present invention relates to a robot controller for controlling an industrial robot, and more particularly to a robot controller having a function of monitoring abnormality of a robot operation. The present invention is applicable to a robot for performing an operation by supplying energy or operational substance to an operational tool mounted on a robot, such as arc welding, sealing, laser beam machining, painting.

2. Description of Related Art

In performing an operation such as arc welding, sealing, laser beam machining, painting by using a robot, an operational tool such as a welding torch, a sealing gun, a laser machining head and a painting gun is mounted on a distal end of a wrist or an arm of a robot. An operation program is prepared and taught to a robot controller such that the operational tool moves along a desired operation path. In the teaching, I/O output commands to start and stop an action of the operational tool are additionally taught to the robot controller at an operation start position and an operation end position, respectively.

When executing the operation program, the operational tool is moved to the taught operation start position and an arc welder or a sealing device, etc. is actuated by an I/O command. Simultaneously, the robot starts an operational motion so that the operational tool moves along the taught operational path to perform the operation such as arc welding, sealing, etc. When the operational tool reaches the end point of the path, the I/O command is outputted to stop the action of the ark welder or the sealing device.

In the above operation, if the execution of the operation program is suspended by a temporary stop signal or an alarm, the processor for controlling the operation detects the temporary stoppage of the program and automatically outputs an I/O command to stop the action of the arc welder or the sealing operation, i.e., extinguish a welding torch or stop supply of sealant.

As described, in the ordinary situation, the arc welding or sealing operation which requires motion of the tool with respect to the workpiece is not performed with the toll unmoved. However, for example, there is a case where the operation program is prepared such that the operation of the arc welder is started at a start point of the welding operation by the I/O command and the robot is starts its motion after confirming an generation of arc by a conformation signal form the arc welder. In this case, if the I/O input signal conforming the generation of arc is not transmitted to the robot controller because of failure of cable etc., the operational tool remains unmoved since the arc generation signal is not received.

If the above event should occur, it raises a serious problem since the arc is generated at the same position on the workpiece with the torch stopped. The workpiece or a jig may be molten by large heart to make a large damage to the system.

A similar case may occur on a robot for use in an operation where operational substance or energy is applied to the workpiece while the operational tool is moving. For example, if paint is continued to be supplied to a painting gun in a stationary state of a painting robot, a workpiece, peripheral equipments and environment of the system are besmeared. If the paint contains highly volatile material there arises a possibility of fire.

Such event is also caused by incompleteness of a software program for controlling an operation of a robot as well as the above-mentioned physical failure such as breakage of a signal cable. For example, it may occur that the robot does not start its operation although a motion command is issued to the robot for the operation program. In this case also, generation of arc or supply of paint is continued while the robot remains stationary to cause the same problem.

SUMMARY OF THE INVENTION

An object of the present invention is to provide a robot controller capable of preventing possibility of accident caused by an abnormal stoppage of a robot by physical failure such as breakage of cables or incompleteness of an operational software for controlling a robot in execution of the operation in which operational substance or energy is applied to an object while moving the operational tool with respect to the object.

A robot controller of the present invention controls and monitors an operation performed by an operational tool mounted on a robot with the operational tool moving or stopping relatively to an object of operation. The robot controller of the present invention comprises: a motion controlling section to control the robot to move the operational tool relatively to the object; a supply device to supply energy to be applied to the object, or supply energy to operational substance to be fused and applied to the object, or supply operational substance to be applied to the object through the operational tool; a supply controlling section to issue a supply command to the supply device for actuating the supply device; a robot stoppage monitoring section to monitor whether or not the relative motion of the operational tool with respect to the object is stopped; a supply command monitoring section to monitor whether or not the supply command is issued to the supply means; a timer to measure a time period during which the relative motion is stopped and also the supply command has been issued to the supply device; and an abnormality determining section to determine an abnormality of the operation when the time period measured by said timer exceeds a predetermined time period.

It is preferable that the predetermined time period for determination of abnormality is variably set as occasion arises. For some kinds of operations, it is preferable that the predetermined time period is set differently for a start of the operation and a midst of the operation. The operational tool may be a welding torch for welding operation, a laser beam machining head for laser beam machining, a sealing gun for sealing operation or a painting gun for painting operation.

In a preferred embodiment, the system software for controlling of an operation of arc welding, sealing, laser machining etc., demands a processor of the controller to detect a start of the operation and monitor command pulses for motors for driving respective robot axes after elapse of a predetermined time period at every processing period.

If all command pulses are zero at a start of the monitoring, an I/O command is immediately outputted to stop the operation and an alarm is issued. After the monitoring is started, if it is detected that all command pulses turn to zero and remain unchanged for a predetermined time period, an I/O command is immediately outputted to stop the operation and an alarm is issued.

The reason for waiting for the predetermined time in determining an abnormality is that it is not unusual for a robot to stop its motion for a short time in a normal operation. For example, in an arc welding operation, a weaving action of moving a welding torch transversely to a welding path is often performed. In this weaving action, welding is performed with the torch stopped for a short time at transverse end points for securing sufficient pads.

In this case, if the arc is stopped immediately after all command pulses turn to zero, i.e., without a waiting time period, the arc welding operation with temporally stoppage is terminated in the midst of the operation.

Also, in the case of spot arc welding, the welding action is performed with the tool stopped for 0.5 to 1 sec. In this case also, if the arc is stopped immediately after all command pulses turn to zero, the spot arc welding is terminated in the midst of the operation.

For the above reasons, it is necessary to wait for a predetermined time period for making a determination of an abnormality. The waiting time period may be differently set for a start of the operation and a midst of the operation. For example, for the arc welding operation, it is preferable to set different waiting time periods for a start and a midst of an operation for the determination of an abnormality. Once the arc is generated, it may and should be determined that an abnormality has occurred after elapse of a short waiting time period because stoppage of the tool in a normal operation (temporary stoppage in the weaving arc welding or dwelling in the spot arc welding) is quite short.

On the other hand, at a start of generation of arc, it takes a considerable time for an arc discharge to generate by electric potential difference between a welding torch and a workpiece from receipt of a command for generating arc to an arc welder. Thus, it is necessary to set a longer waiting time period for a start of the operation for determination of an abnormality of the operation. For the above reasons, it is appropriate that the determination of abnormality is made on the basis of different criterions for a start and a midst of the arc welding operation. The different waiting time periods may be set in advance and selectively used for the start and midst of the operation.

BRIEF DESCRIPTION OF THE DRAWINGS

FIG. 4 is an example of an operation program for performing an arc welding operation;

DETAILED DESCRIPTION OF THE PREFERRED EMBODIMENTS

Figure 1:
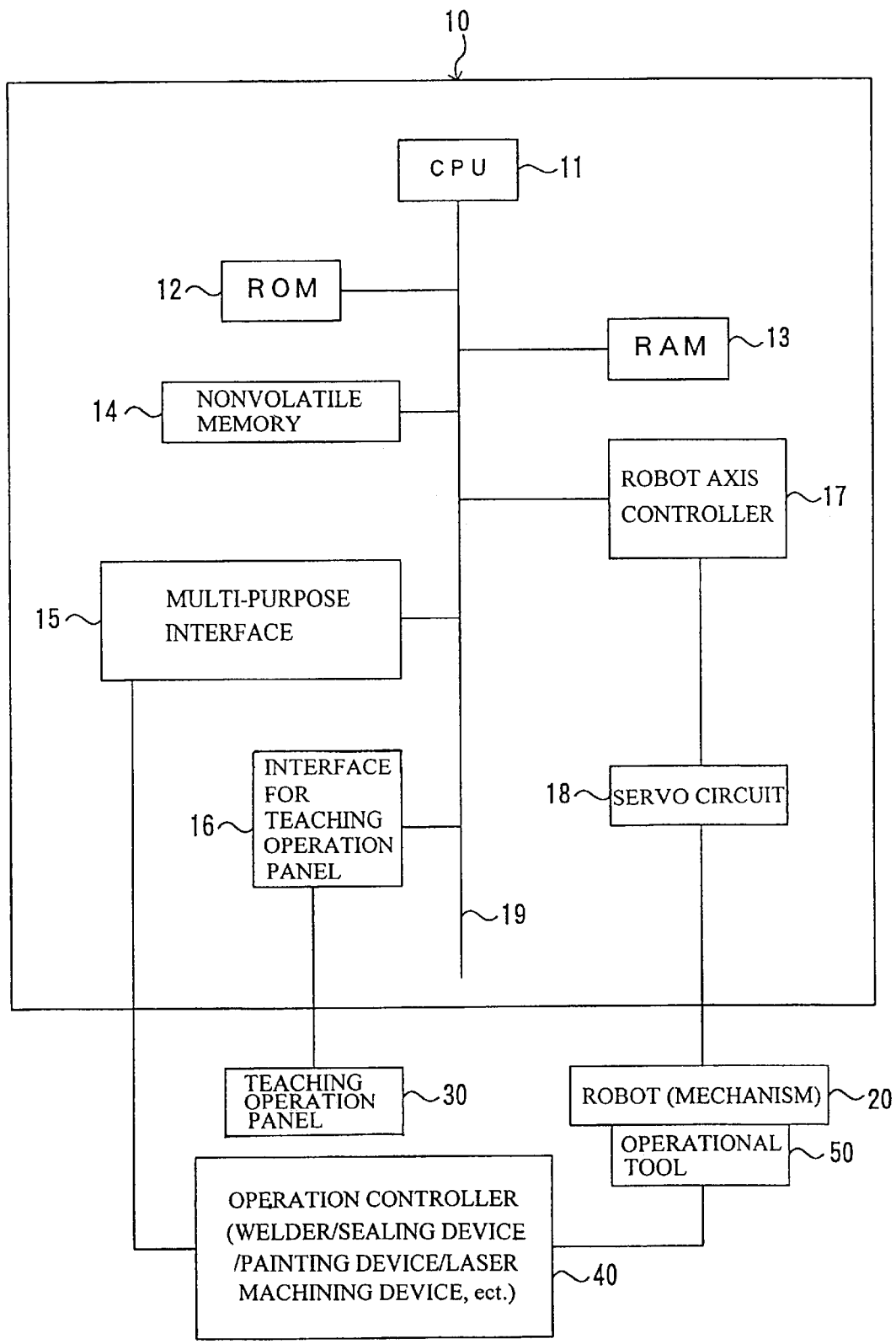
FIG. 1 is a schematic block diagram showing general constitution of a robot system to which the present invention is applied.

FIG. 1 is a block diagram showing principal parts of a robot system including a robot controller to which the present invention is applied. In FIG. 1, a robot controller 10 has a CPU (central processing unit) 11. The CPU 11 is connected to a memory 12 of ROM, a memory 13 of RAM, a nonvolatile memory 14, a universal peripheral interface 15 for receiving and issuing input/output (I/O) signal from/to peripheral equipments, an interface 16 for a teaching operation panel 30 and a robot axis controller 17. The robot axis controller 17 controls respective axes of a robot (mechanism) 20 through servo circuits 18.

The universal peripheral interface 15 is connected to an operation controller 40 as a peripheral equipment. The operation controller 40 and its associated operational tool 50 are selected in accordance with a kind of operation to be performed. For example, in the case where the operation to be performed is arc welding, the operational tool 50 is a torch for arc welding and the operational controller 40 is an arc welding controller for controlling supply of electric current, a welding rod and shield gas, etc. In the case where the operation to be performed is sealing, the operational tool 50 is a sealing gun and the operation controller 40 is a sealing controller for controlling supply of sealant, etc.

Arc welding is performed by fusing metals to be welded with persistent luminescent electric discharge (arc) being used as a heat source, or by fusing a filler metal (welding rod or wire) and applying it to an object. A welding torch of an arc welder is mounted on the distal end of the robot wrist, and a welding current flowing in the welding torch is controlled, by which energy applied for welding is controlled.

The ROM 12 and the nonvolatile memory 14 shares storage of data for system software (programs and parameter data, etc). For example, operation programs for defining operation details and associated parameters are stored in the nonvolatile memory 14 and software data not requiring rewriting are stored in the ROM 12. Set values of waiting time period, as described later, for determining an abnormality of operation are stored in the nonvolatile memory 14. These set data and the operation programs are capable of inputting, correcting, editing, deleting, etc. through the teaching operation panel 30. The ROM 13 is used for temporary storage of data for computing process by the CPU 11.

Figure 2:
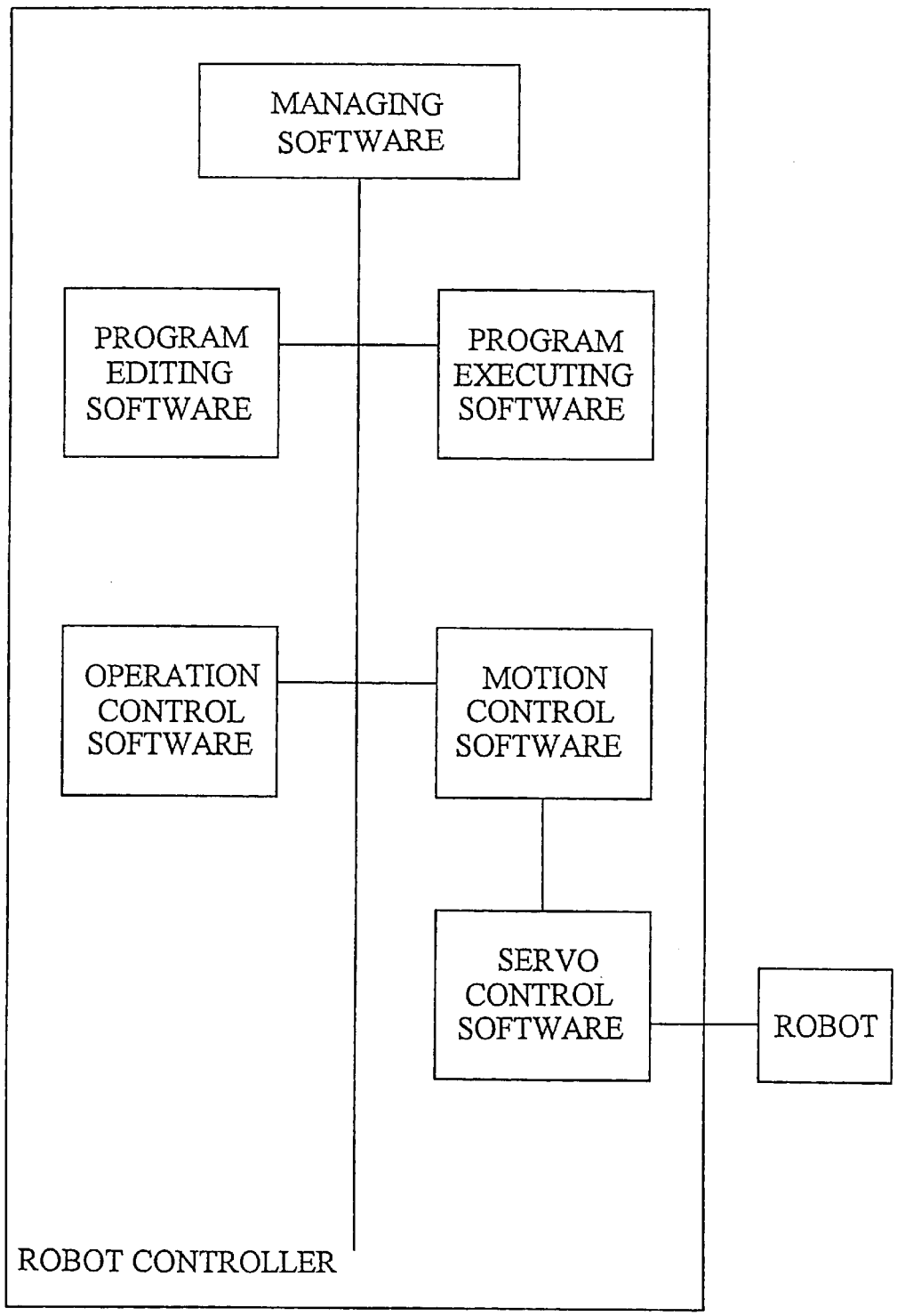
FIG. 2 is a schematic block diagram of a system software for controlling the robot system.

The system software for controlling the robot system has construction as shown in FIG. 2. The system software comprises a managing software including operation system for controlling the whole system, an editing software for creating and editing a program by a user, a program execution software for reading and executing the program, a robot motion control software and an operation control software for controlling and monitoring an operation performed by the robot.

Figure 3:
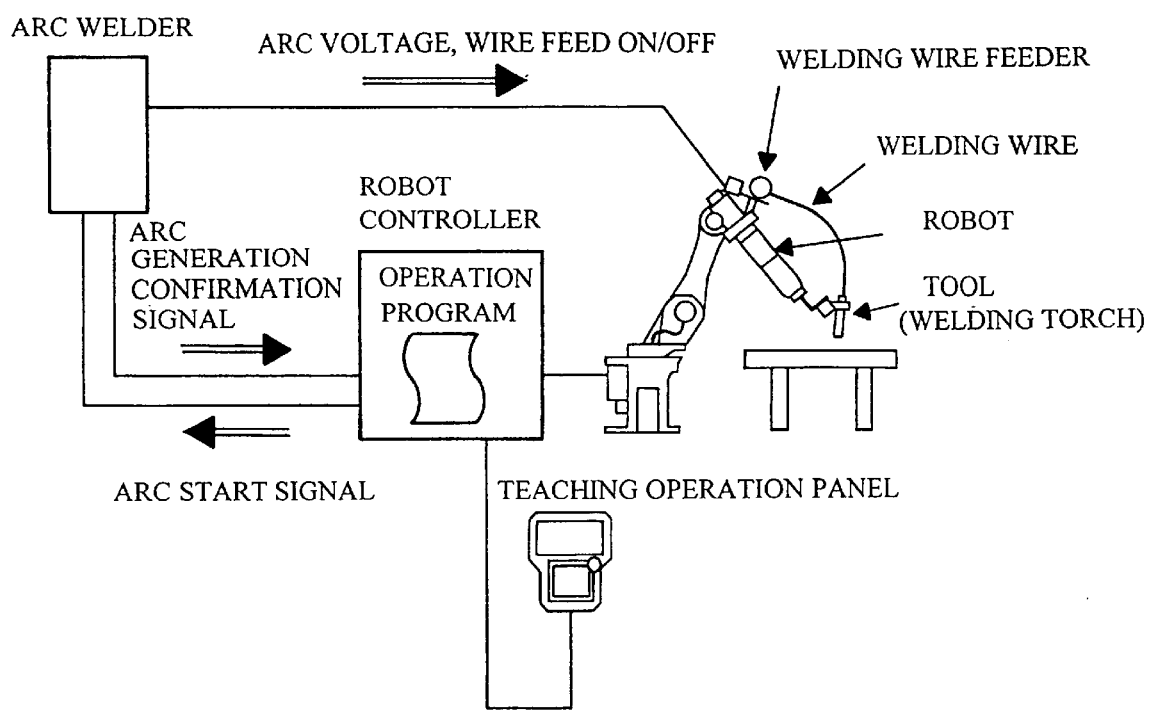
FIG. 3 is a schematic diagram for showing an entire arrangement of a robot system for performing an arc welding operation.

The arrangement and the operation program of the robot system in an example of performing an arc welding operation will be explained referring to FIGS. 3 and 4. When a command for executing the operation program is issued, the CPU 11 (hereinafter referred to as a processor) in the robot controller shown in FIG. 1, reads and executes the operation program, as shown in FIG. 4, line by line on demand of the program execution software.

When the processor reads a motion statement (at first to third, sixth to eighth, tenth or eleventh line in the example of FIG. 4), the processor creates command data for robot motion and transfer the created data to the operation control software to wait for completion of the motion. The operation control software demands the processor to execute computing operations for moving the operational tool form the present position to the target position at the designated speed commanded by the motion command data.

The results of the computing operation is converted into command pulses for motors for driving respective robot axes and written in a memory region set in the RAM 13. The servo system (circuit) read out the values written in the memory region at every predetermined period and transfer them to the respective motors as command pulses. Thus, the operational tool starts to move to the target position at the commanded speed. When the operational tool reaches the target position, the operation control software informs the program execution software of the arrival of the operational tool at the target position.

When the processor reads out an I/O output (ON) statement such as the fourth line in FIG. 4 in execution of the operation program, an ON signal is issued on a designated signal line. In response to the ON signal, the arc welder connected to the signal line is actuated to start its action. The operation control software demands the processor to perform necessary control and monitoring of the operation when the ON signal is outputted on the designated signal line.

When the processor reads out an I/O output (OFF) statement such as the ninth line in FIG. 4, an OFF signal is issued on a designated signal line. In response to the OFF signal, the arc welder connected to the signal line stops its action. The operation control software demands the processor to terminate the control and monitoring of the operation when the OFF signal is outputted on the designated signal line.

When the I/O output (ON) signal is outputted, the processor reads out a monitoring waiting time period predetermined for a start of operation from the memory and set the waiting time period to the timer on demand of the operation control software. When the waiting time period is set, the managing software starts to count down the timer and when the set time period elapses, the managing software informs the operation control software of the elapse of the set time period.

Upon receipt of information of elapse of the set time period, the processor accesses the memory region to which the command pulses are written on demand of the operation control software. If all command pulses stored in the memory region are zero, the operation control software determines that an abnormality has occurred and outputs an I/O OFF signal on the signal line to terminate the operation.

The processor accesses the memory region to which the command pulses are written at every predetermined processing period after the start of the operation on demand of the operation control software. If the values read at any processing period are all zero, the processor reads a monitoring waiting time for a midst of operation from the memory and sets the monitoring waiting time to the timer. When the set time period elapsed, the elapse of the set time period is informed to the operation control software in the same manner as described.

Upon receipt of the information of elapse of the set time period, the processor accesses the memory region to which the command pulses are written again and if the read values are all zero, it is determined that an abnormality has occurred in the midst of the operation and the operation is terminated by issuing an I/O output OFF signal. In the case where the read values are all zero at any processing period and thus the waiting time period is set to the timer, if the command pulses read in the subsequent processing period are not zero, the setting of the timer is canceled. The processor continues monitoring of the command pulses at every predetermined processing period until the I/O output OFF signal is outputted to the operational tool to terminate the operation.

Figure 5:
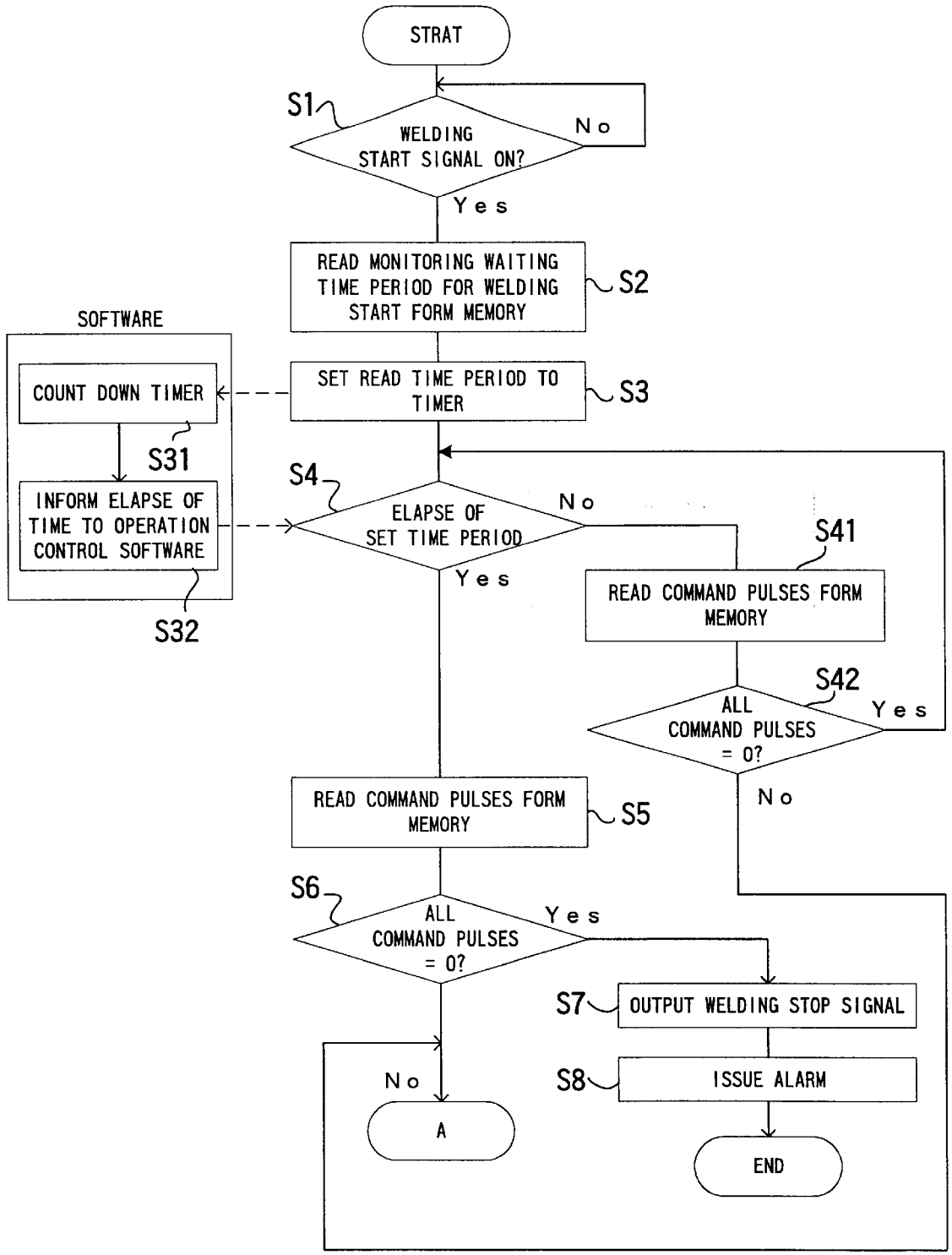
FIG. 5 is a flowchart of processing to be performed according to an operation control software.
Figure 6:
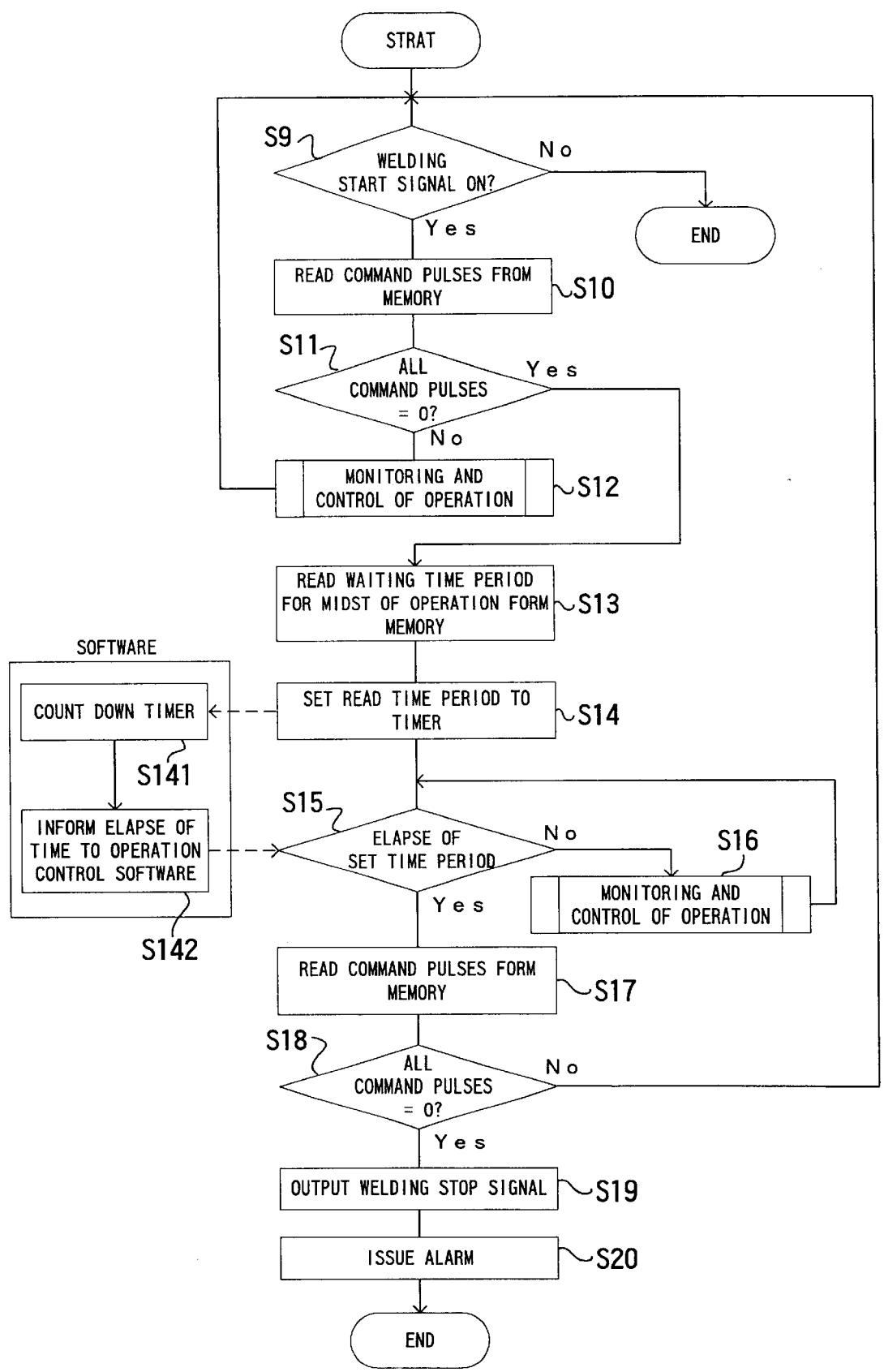
FIG. 6 is a continuation of the flowchart of FIG. 6.

The foregoing description is made on arrangement and operation of the embodiment of the present invention and the processing to be performed under the operation control software for performing the abnormality determination and monitoring function of the present invention is shown in FIGS. 5 and 6. The followings are essential points of each step in conformity with the arrangement of the arc welding robot system as shown in FIG. 3 and the operation program as shown in FIG. 4.

(Step S1)

It is determined whether or not the welding start signal is ON. In the example of the operation program as shown in FIG. 4, from the first line to the third line, the determination result is NO, and the procedure does not enter Step S2. When the fourth line of the operation program is read out, the welding start signal is turned ON to start an action of the arc welder. Immediately after the welding start signal is turned on, determination turns to YES and the procedure enters Step S2.

(Step S2)

The waiting time period for the start of the welding is read out from the memory.

(Step S3)

The read out waiting time period is set to the timer and the set-up of the timer is informed to the managing software. The managing software demands the processor to count down the set time (Step S31) and informs the elapse of the set time to the operation control software (Step S32).

(Step S4)

Waiting for completion of countdown of the timer. While the countdown is not completed, the command pulses are read out from the memory shared by the servo controller and the NC device, in which the command pulses are written (Step S41). If all command pulses are zero, the procedure returns to Step S4 to determine the completion of the timer, and if all command pulses are not zero, i.e., any of the command pulses is not zero, the countdown of the timer is canceled and the procedure proceeds to Step S9 in FIG. 6.

(Step S5)

It is determined whether or not the read out command pulsed are all zero. If the determination result is YES, it means that it is highly possible that robot remains unmoved for a time period longer than the monitoring waiting time period predetermined for a start of the welding operation. Therefore, it is determined that an abnormality has occurred and the procedure proceeds to Steps S7 and S8.

If the determination result is NO, it means that the robot has started its motion within the monitoring waiting time for a start of the welding operation. Therefore, it is determined that the robot operates normally and the prodedure proceeds to Step S9 in FIG. 6.

(Step S7)

A welding stop signal is outputted to shut down arc voltage as well as supply of welding wire and shield gas.

(Step S8)

An alarm is issued and the procedure is terminated. The alarm is implemented by a graphical display on a liquid crystal display associated with the teaching operation panel and/or a sound of buzzer.

(Step S9)

Subsequent Steps are for "control and monitoring after start of operation". First, it is determined whether or not the welding start signal is turned ON. If the determination result is NO, it means that the operation is completed and the procedure terminates.

In the example of the operation program shown in FIG. 4, from fourth line to eighth line, the determination result is Yes and the procedure proceeds to Step S10.

(Step S10)

The processor accesses the memory region of the common memory to read out the motion command pulses.

(Step S11)

It is determined whether or not the read out command pulses are all zero. If the determination result is Yes, it means that the robot is stopped while the arc is generated and therefore the procedure proceeds to Step S13.

If the determination result is No, it means that the robot is in motion and the status of the robot operation is all right and the procedure proceeds to Step S12.

(Step S12)

Monitoring and control are continued by repeatedly executing Steps S9–S11. As described, if the determination result in Step S9 turns No, the procedure is terminated and if the determination result in Step S11 turns NO, the procedure proceeds to Step S13.

(Step S13)

The monitoring waiting time predetermined for midst of operation is read out from the memory.

(Step S14)

The read out waiting time is set to the timer and the set-up of the timer is informed to the managing software. The managing software commands the processor to count down the timer (Step S141) and informs a completion of the countdown to the operation control software (Step S142).

(Step S15)

Waiting for a completion of the countdown of the timer while continuing the monitoring and control of the operation in Step S16. When the information of completion of the countdown of the timer is received, the procedure proceeds to Step S17.

(Step S16)

The operation is monitored and controlled and the procedure returns to Step S15.

(Step S17)

The motion command pulses are read out form the memory region in the shared memory to which the command pulses for respective servomotors are written.

(Step S18)

It is determined whether or not the read out commands are all zero. If the determination result is No, it means that the robot is returned to a normal operation state within the waiting time predetermined for midst of operation. Therefore, it is judged that the robot operate normally and the procedure returns to Step S9.

If the determination result is Yes, it is highly possible that the robot has been stopping for a time period longer than the waiting time predetermined for the midst of operation. Therefore, it is deemed that an abnormality of operation has occurred and the procedure proceeds to Steps 19 and 20.

(Step S19)

The welding stop signal is outputted to terminate generation of arc and also the supply of welding wire and shield gas are terminated.

(Step S20)

An alarm is issued and the procedure terminates. The alarm is implemented by a graphical display on a liquid crystal display associated with the teaching operation panel and/or a sound of buzzer.

With the above described procedure, abnormal stoppage of the operational tool at the start of the operation and in the midst of the operation is accurately detected and in response to the detection, necessary measure for preventing serious matter is taken.

The above description is made on the case where the robot performs a welding operation. The similar processing can be applied to the cases where the robot performs other operations such as sealing, laser beam machining, painting. In these case, ON/OFF signal for arc welder is substituted by an ON/OFF signal for a sealing gun, a laser beam head, a painting gun, etc.

According to the present invention, if the operational tool, which is mounted on a robot and requires motion such as an arc welding torch, a sealing gun and a laser machining head, does not move over a time period predetermined in accordance with a kind or a situation of the operation while the tool is in actuation, the actuation of the operational tool is forcedly and immediately stopped. Thus, the serious problems caused by such abnormal state of the robot can be securely prevented.

What is claimed is:

1. A robot controller for controlling and monitoring an operation performed by an operational tool mounted on a robot with the operational tool moving or stopping relatively to an object of operation, said robot controller comprising:

a motion controlling section to control the robot to move the operational tool relatively to the object;

a supply device to supply energy to be applied to the object through said operational tool;

a supply controlling section to issue a supply command to said supply device for actuating said supply device;

a robot stoppage monitoring section to monitor whether or not the relative motion of the operational tool with respect to the object is stopped;

a supply command monitoring section to monitor whether or not the supply command is issued to said supply means;

a timer to measure a time period during which the relative motion is stopped and also the supply command has been issued to the supply device; and an abnormality determining section to determine an abnormality of the operation when said time period measured by said timer exceeds a predetermined time period.

2. A robot controller according to claim 1, wherein said predetermined time period is variably set.

3. A robot controller according to claim 1, wherein said predetermined time period is set differently for a start of the operation and a midst of the operation.

4. A robot controller according to claim 1, wherein said operational tool is one of a welding torch and a laser beam machining head.

5. A robot controller for controlling and monitoring an operation performed by an operational tool mounted on a robot with the operational tool moving or stopping relatively to an object of operation, said robot controller comprising:

a motion controlling section to control the robot to move the operational tool relatively to the object;

a supply device to supply energy to operational substance to be fused and applied to the object through said operational tool;

a supply controlling section to issue a supply command to said supply device for actuating said supply device;

a robot stoppage monitoring section to monitor whether or not the relative motion of the operational tool with respect to the object is stopped;

a supply command monitoring section to monitor whether or not the supply command is issued to said supply means;

a timer to measure a time period during which the relative motion is stopped and also the supply command has been issued to the supply device; and an abnormality determining section to determine an abnormality of the operation when said time period measured by said timer exceeds a predetermined time period.

6. A robot controller according to claim 1, wherein said predetermined time period is variably set.

7. A robot controller according to claim 1, wherein said predetermined time period is set differently for a start of the operation and a midst of the operation.

8. A robot controller according to claim 1, wherein said operational tool is a welding torch.

9. A robot controller for controlling and monitoring an operation performed by an operational tool mounted on a robot with the operational tool moving or stopping relatively to an object of operation, said robot controller comprising:

a motion controlling section to control the robot to move the operational tool relatively to the object;

a supply device to supply operational substance to be applied to the object through said operational tool;

a supply controlling section to issue a supply command to said supply device for actuating said supply device;

a robot stoppage monitoring section to monitor whether or not the relative motion of the operational tool with respect to the object is stopped;

a supply command monitoring section to monitor whether or not the supply command is issued to said supply means;

a timer to measure a time period during which the relative motion is stopped and also the supply command has been issued to the supply device; and an abnormality determining section to determine an abnormality of the operation when said time period measured by said timer exceeds a predetermined time period.

10. A robot controller according to claim 1, wherein said predetermined time period is variably set.

11. A robot controller according to claim 1, wherein said predetermined time period is set differently for a start of the operation and a midst of the operation.

12. A robot controller according to claim 1, wherein said operational tool is one of a sealing gun and a painting gun.

13. An apparatus, comprising:

a timer to measure a time period during which relative motion of a robot is stopped and also an elapsed time period that an activation command has been issued to the robot; and an abnormality determining section to determine an abnormality of operation of the robot, when said time period measured by said timer exceeds a predetermined time period.

14. A method, comprising:

measuring a time period during which relative motion of a robot is stopped;

measuring an elapsed time period that an activation command has been issued to the robot; and determining an abnormality of operation of the robot, when said time period measured by said timer exceeds a predetermined time period.

* * * * *